United States Patent
Vives Clavel

(10) Patent No.: US 6,231,350 B1
(45) Date of Patent: May 15, 2001

(54) PERFECTED PROTECTION AND CUTTING UNIT BY FLAP COVER, FOR CONNECTION AND TESTING MODULES OF TELEPHONE LINES

(75) Inventor: Juan Vives Clavel, Albuixech (ES)

(73) Assignee: Mondragon Telecommunications, S.L., Valencia (ES)

( * ) Notice: Subject to any disclaimer, the term of this patent is extended or adjusted under 35 U.S.C. 154(b) by 0 days.

(21) Appl. No.: 09/047,831

(22) Filed: Mar. 25, 1998

(30) Foreign Application Priority Data

Mar. 25, 1997 (ES) .................................................. 9700775

(51) Int. Cl.⁷ .................................................. H01R 11/30
(52) U.S. Cl. .................................................. 439/40
(58) Field of Search .............................. 439/41, 607, 609, 439/610, 38, 39, 40

(56) References Cited

U.S. PATENT DOCUMENTS 4,451,113 * 5/1984 Zuniga ..................................... 439/40
5,414,765   5/1995 Lanquist et al. .
5,476,386 * 12/1995 Booth ..................................... 439/40
5,687,213  11/1997 Larkin .
5,872,831   2/1999 Zoiss et al. .

FOREIGN PATENT DOCUMENTS 1027218   2/1994 (ES) .

* cited by examiner

Primary Examiner—Khiem Nguyen
Assistant Examiner—J. F. Duverne
(74) Attorney, Agent, or Firm—Ladas & Parry

(57) ABSTRACT

This unit comprises two independent rectangular prismatic parts, fitted into each other by superposition, the top or head of the unit involving a flap cover articulated on one of its sides, which carries on its top face, a handle for activation and on the lower face, the continuity bridges. The continuity is established among the service and the couple terminals, two by two, in such a manner, that when the cover is rotated during the opening movement it carries said continuity bridges with it, simultaneously emerging from end grooves for insertion of said service and couple terminals, remaining joined to the cover and the latter, to the head of the unit by means of its hinge.

13 Claims, 1 Drawing Sheet

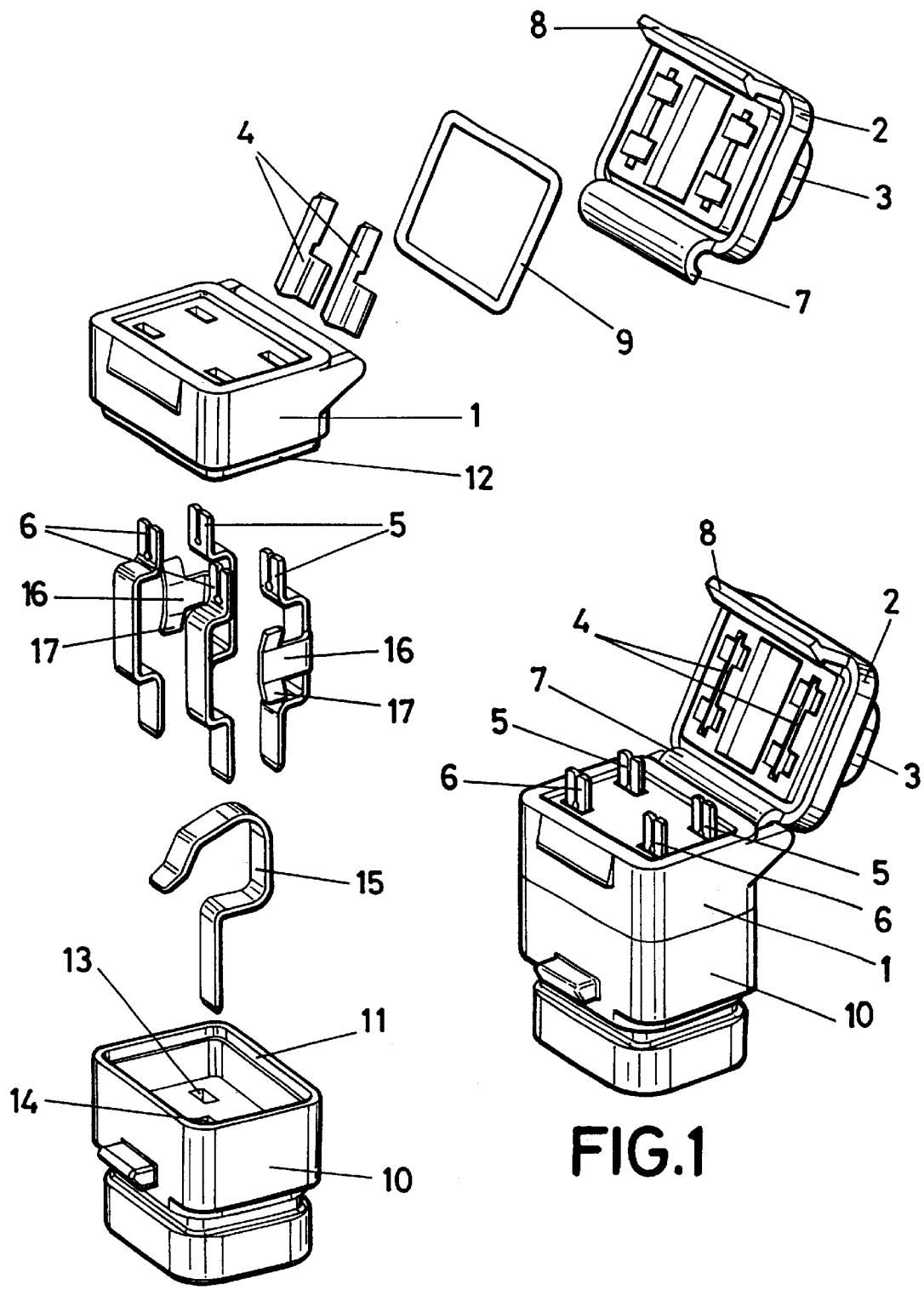

PERFECTED PROTECTION AND CUTTING UNIT BY FLAP COVER, FOR CONNECTION AND TESTING MODULES OF TELEPHONE LINES

OBJECT OF THE INVENTION

The object referred to by the invention which is protected by this patent consists of a "Perfected protection and cutting unit by flap cover, for connection and testing modules of telephone lines".

It consequently deals with a component element of said modules, in which the following functions are attributed.

a) The optional and temporary interruption of the network/subscriber electric continuity for conduction of the tests, without operating with the permanent connections of the module.

b) Accessibility to the appropriate contacts, in order to facilitate checking of the technical characteristics of the connection.

c) Protection against fortuitous irregularities of the constants of the current, especially overvoltages.

BACKGROUND OF THE INVENTION

The holder company of the present patent, is also holder of Spanish Utility Model 9400528, granted and in force, the object of which is a "Perfected connection and testing module of telephone lines", in which a protection and cutting unit is integrated, the object of this Title offering advantagous differences over the same.

In effect, in the former, the cutting function was performed by means of the manual extraction of the protection unit, with which the continuity bridges in their interior were removed, interrupting the connection between the service (subscriber) and the couple (line) terminals, making one and the other accessible for performance of the testing.

During the development of these tests, the removed unit had to be held in the hand of the operator or provisionally put away, always introducing an obstruction in the task of the same, and additionally, since the work on a module is normally conducted in an inaccessible location without ladders, the dropping of the loose unit implied its loss or breakage, due to its reduced dimensions.

DESCRIPTION OF THE INVENTION

The purpose of the invention which constitutes the object of this patent is to solve the disadvantages which are proper to the known, previously described, protection and cutting unit, having been conceived and designed in compliance with this objective.

For this, continuity bridges have been incorporated to a rectangular flap cover, in such a manner that the rotational raising of the same by one of its sides, hinged, conducts the cutting function when removed from the terminals without separating the protection unit module.

The structure of the same comprises two independent rectangular prismatic parts, fitted to each other by superpositioning: the one on top, which is head of the unit, involves a flap cover, articulated on one of its sides, which carries on its top face, a handle for activation and on its bottom face, the continuity bridges, which establish them between the service and the couple terminals, two by two, in such a manner, that when the cover is rotated during the opening movement, it carries with it said continuity bridges, which simultaneously emerge from end grooves for insertion of said service and couple terminals, remaining joined to the cover, and the latter, to the head of the unit by means of its hinge.

Said terminals emerge through the bottom of the head, remaining accessible for performance of the tests and inaccessible when the cover is closed, leaving the continuity bridges inserted in their end grooves and assuring the connection and the closure by means of a pin which fits into the side of the head opposite the hinge, in sealed manner by means of an O-ring.

The bottom part, which is the body of the unit, presents a peripherical recess on its top edge, for the precision fit of the lower flange of the unit head, showing on the bottom of its hollow interior, four notches placed in respective proximity to the corners, for the passage of the lower ends of the service and the couple terminals, plus a central notch for passage of the grounding terminal, said interior capable of being filled with an insulating product to assure the sealing of the union between the head and the body of the unit and to increase the dielectric stiffness between terminals.

The service terminals present sideways, on their central zone, various pins with respective transversal protection contacts of confronted convex surfaces, which permit the parallel coupling to the same, of an ionizable noble gas discharger which, clamped by the grounding terminal, grounds the connection in case overvoltages are produced in the network in excess of a preset limit value.

The lower ends of all the service terminals, couples and grounding, penetrate through the bottom of the body so that, emerging through the lower face, they establish contact with the respective connection strips of the module, fitting into the same.

The existance in the body of the unit of five contacts which are accessible prior to their sealed closure, constituted by the two service, the two couples and the grounding terminals, permit the attribution to the unit of diverse specific protection or checking functions, by means of the series or parallel coupling of suitable known means as for example, frequency filters, variable resistances (PTC) etc., independently from the already described gas discharger.

BRIEF DESCRIPTION OF THE DRAWINGS

In order to complement the description of the invention, and to facilitate the interpretation of its characteristics, formal, structural and functional, drawings are enclosed in which are schematically represented, different aspects of a preferred embodiment of the perfected protection and cutting unit by a flap cover, for connection and testing modules of telephone lines, which constitutes the object of the present Utility Model.

In said drawings:

FIG. 1 shows a perspective view of the unit which constitutes the invention, totally assembled and coupled, ready for its insertion in the connection and testing module or block of telephone lines.

FIG. 2 is also a perspective view of the unit, though exploded in order to show its structure, separately presenting each one of its components, in the ordered according to their sequence of assembly.

DESCRIPTION OF A PREFERRED EMBODIMENT

In order to show clearly the nature and the scope of the advantages application of the perfected protection and cutting unit by a flap cover, for connection and testing modules of telephone lines, which constitutes the object of the invention, herewith described are its structure and its operation, making reference to the drawings which, representing a preferred embodiment of said object with informative character, must be considered in the widest and non limitative sense of the application and the content of the invention.

The structure is made up of two independent re s, fitted into each other by superposition: the top part (1), which is head of the unit, involves a flap cover (2), articulated on one of its sides, which carries on its exterior face, a handle (3) for activation, and on its interior face, the continuity bridges (4), in such a manner, that when the cover (2) is rotated during the opening movement, it carries with it said bridges (4), which simultaneously emerge from end grooves for insertion of the service (5) and the couple (6) terminals, remaining joined to the cover (2) and the latter, to the head (1) of the unit by means of its hinge (7).

Said terminals (5) and (6) emerge through the bottom of the head (1), becoming accessible for the conduction of tests and inaccessible when the cover (2) is closed, leaving inserted in their end grooves, the continuity bridge (4) and assuring the connection and the closure by means of a pin (8) which fits into the side of the head (1) opposite to the hinge (7) in a sealed manner by means of an O-ring (9).

The lower part (10), which is the body of the unit, presents a peripherical recess (11) on its upper edge, for the precision fit of the bottom flange (12) of the head (1) of the unit, showing on the bottom of its interior gap, four notches (13) placed in respective proximity to the corners, for the passage of the lower ends of the service (5) and the couple (6) terminals, plus a central notch (14) for the passage of the grounding terminal (15), said interior capable of being filled with an insulating product to assure the sealing of the union between the head (1) and the body (10) of the unit and to increase the dielectric stiffness between the terminals.

The service terminals (5) present sideways, on their central zone, various pins (16) with respective transversal protection contacts (17), with confronted convex surfaces, which permit the parallel coupling among them, of an ionizable noble gas discharger, which, clamped by the grounding terminal (15), grounds the connection in case that overvoltages are produced in the network in excess of a preset limit value.

The lower ends of all the service (5), couple (6) and grounding (15) terminals penetrate through the bottom of the body (10) so that, emerging from its lower face, they establish contact with the respective connection strips of the module, fitting into the same.

The existance in the body (10) of five contacts which are accessible prior to the sealed closure, constituted by the two service (5), the two couple (6) and the grounding (10) terminals, permit the attribution to the unit of diverse specific protection or checking functions by means of the series or parallel coupling of the known suitable means.

Once the nature and the functional scope of the invention have been sufficiently described as well as a preferred embodiment for their performance, it is indicated, that in the same may be variable the materials, shapes, dimensions and in general, all those accessory or secondary characteristics which do not alter, change or modify its essentiality, which is included in the following.

What is claimed is:

1. A module for providing electrical connection and disconnection, testing, and optionally circuit protection, between telecommunications network conductor pairs and subscriber line conductor pairs in said module, the module comprising:

a) first connection means adapted to connect said network conductor pairs to the module and second connection means adapted to connect said subscriber line conductor pairs to the module;

b) a body portion (10,1) having a body end and a head end and containing terminals (5,6) arranged to establish electrical connection (i) to the network pairs via said first connection means and (ii) independently to the subscriber pairs via said second connection means, the terminals extending electrically to the head end of the body portion; and c) a cover (2) for and hinged to said head end which cover carries continuity bridges (4) arranged so that when the cover is closed over said head end the terminals are concealed and the bridges establish electrical continuity between the terminals (5) arranged for connection to the network pairs and the corresponding terminals (6) arranged for connection to the subscriber pairs, and when the cover is opened said electrical continuity is broken and the terminals are accessible.

2. A module according to claim 1, including a snap-fitting catch arranged to releasably secure the cover in the closed position.

3. A module according to claim 1 incorporating sealing gasket means which seals the body portion when the cover is closed.

4. A module for providing electrical connection and disconnection, testing, and optionally circuit protection, between telecommunications network conductor pairs and subscriber line conductor pairs, the module comprising a) first connection means adapted to connect said network connector pairs to the module and second connection means adapted to connect said subscriber line conductor pairs to the module;

b) a body portion having a body end part (10) and a separable head end part (1) adapted for releasable assembling together;

c) terminals (5,6) arranged to extend through the assembled body portion and to establish electrical connection to the network pairs via said first connection means and independently to the subscriber pairs via said second connection means; and d) continuity bridge means (4) operable to reversibly establish and break electrical continuity between the terminals (5) arranged for connection to the network pairs and the corresponding terminals (6) arranged for connection to the subscriber pairs.

5. A module according to claim 1 or 4, wherein said body portion (i) includes a ground terminal (15) arranged to establish electrical connection to earth potential and (ii) is adapted to enclose a current protection device electrically connected between the ground terminal and one or more of the other terminals.

6. A module according to claim 5, wherein said circuit protection device is an ionisable gas discharger capable of earthing over-voltages in excess of a predetermined limit.

7. A module according to claim 5, wherein said body portion has a body end part (10) and a separable head and part (1) adapted for releasable assembling together and said ground terminal (15) and said circuit protection device when present are included in said body end part (10) and do not extend into said head end part (1).

8. A module according to claim 4, wherein said body end part and said head end part are adapted to fit together telescopically.

9. A module according to claim 4, wherein said head end part (1) and/or said body end part (10) contain(s) hollow passages through which said terminals (5,6) extend when said head end part (1) and said body end part (10) are assembled together.

10. A module according to claim 1, wherein said body portion is provided as a separate unit adapted for fitting removably into the module.

11. A module according to claim 1, wherein said body portion surrounding the terminals is at least partly filled with an electrically insulating sealing material.

12. A module according to claim 4, wherein said body portion is provided as a separate unit adapted for fitting removably into the module.

13. A module according to claim 4, wherein said body portion surrounding the terminals is at least partly filled with an electrically insulating sealing material.

* * * * *